United States Patent [19]

Nyman

[11] 4,159,106
[45] Jun. 26, 1979

[54] VEHICULAR SUSPENSION UNIT

[76] Inventor: Bengt E. Nyman, 5514 S. Crow's Nest Rd., Tempe, Ariz. 85283

[21] Appl. No.: 850,237

[22] Filed: Nov. 10, 1977

[51] Int. Cl.² .............................. F16F 9/06; F16F 9/34
[52] U.S. Cl. .................................. 267/64 B; 137/493; 267/64 R; 280/708
[58] Field of Search ............... 188/314, 315, 322, 313, 188/318; 137/493, 496; 280/708; 267/64 R, 64 A, 64 B, 151, 34

[56] References Cited

U.S. PATENT DOCUMENTS

| 2,038,032 | 4/1936 | Flynn | 188/314 X |
| 2,723,007 | 11/1955 | Lanphere | 188/313 |
| 3,389,766 | 6/1968 | Biabaud | 188/322 X |

FOREIGN PATENT DOCUMENTS 1205846  11/1965  Fed. Rep. of Germany ......... 267/64 B Primary Examiner—George E. A. Halvosa
Attorney, Agent, or Firm—Cahill, Sutton & Thomas

[57] ABSTRACT

A force sensitive suspension unit for vehicles differentiates between the dynamic characteristics of the vehicle and the characteristics of the unsprung weight of the wheel assembly. Consequently, the independent parameters of vehicle isolation and comfort are segregably reconcilable with optimum wheel to ground response.

13 Claims, 10 Drawing Figures

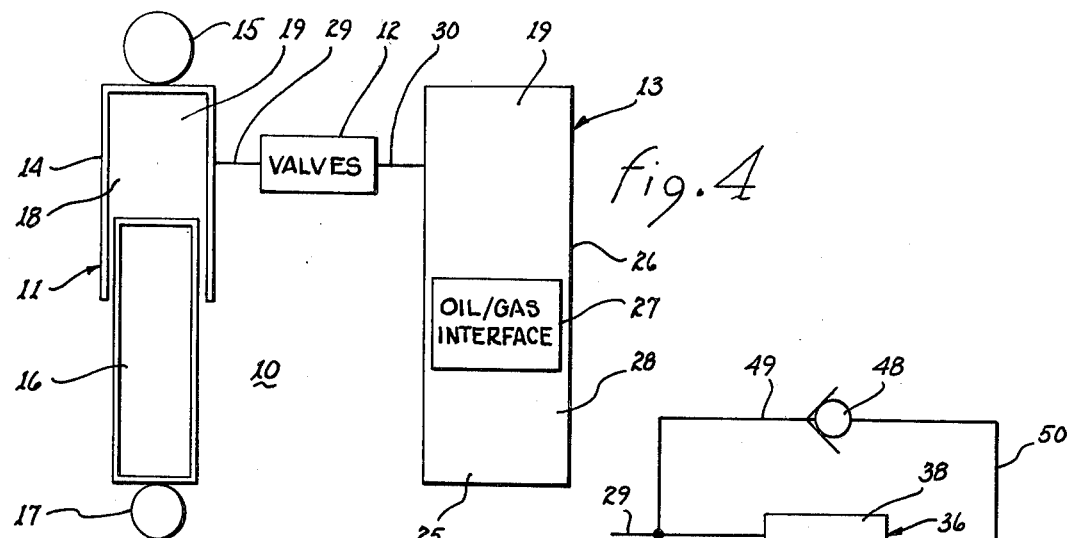
fig.4
fig.5
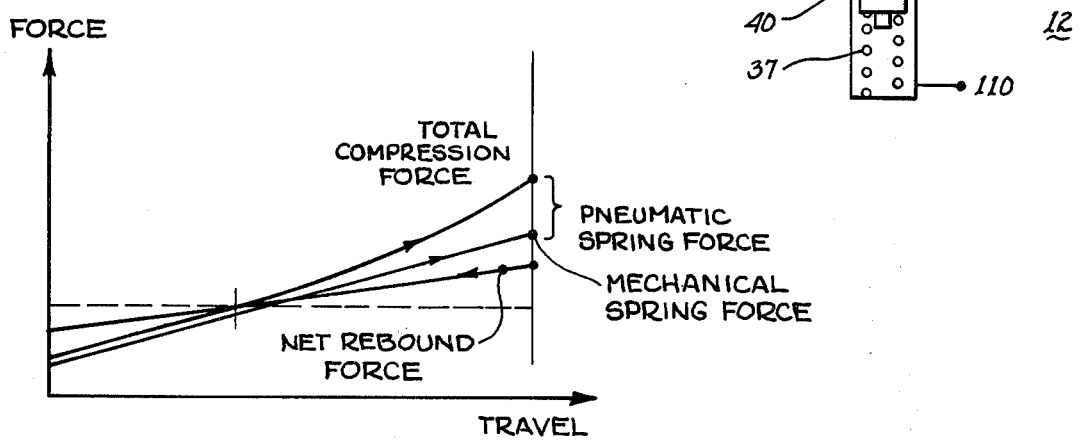
fig.6
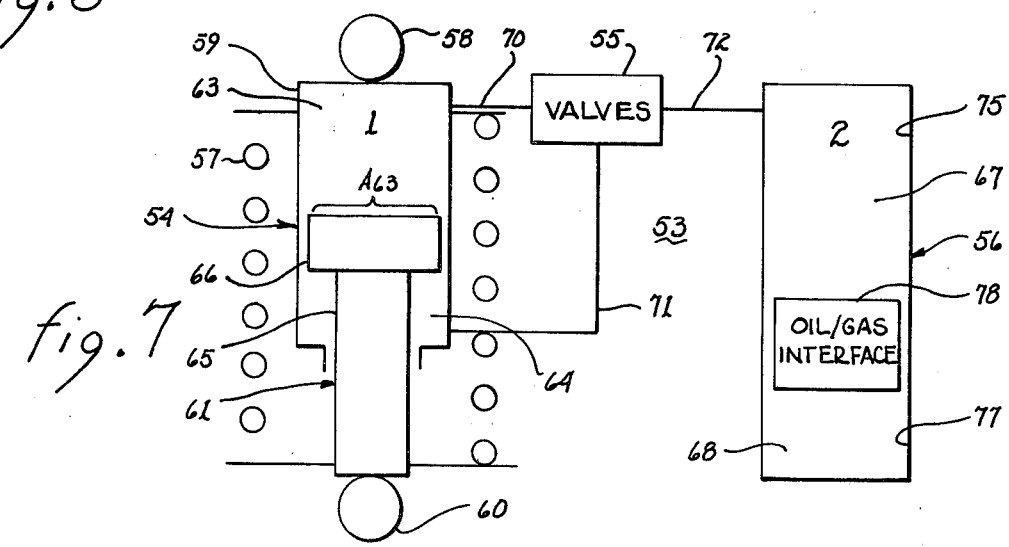
fig.7

VEHICULAR SUSPENSION UNIT

The present invention relates to suspension systems and, more particularly, to force sensitive suspension units.

A typical vehicular suspension system in 1927 consisted of a steel spring and a hydraulic dash pot. The steel spring is still with us and the dash pot has developed into today's shock absorber. Extensive efforts have gone into refining the internal valving used to shape and control the effect of the viscous damping, the basic principle of the shock absorber. Except for minor improvements, the operation of the shock absorber has remained principally the same as that of the 1927 dash pot.

Operation of conventional shock absorbers is based upon velocity sensitive viscous damping to limit the vertical velocity that the vehicle is subjected to during rebound of the suspension. Automatically, the maximum rebound velocity available to reposition the wheel on the road surface is similarly restricted.

Riding comfort and drivability requires the limiting of the vertical acceleration and vertical velocity of the vehicle; high speed performance, however, requires rapid vertical rebound of the wheels. Presently, conventional shock absorbers strike a compromise between these two opposing requirements with a bias toward comfort and drivability, resulting in a consequential degradation of high speed performance.

In particular, existing viscous damping shock absorbers sense the relative velocity between the vehicle and its wheels. The use of such relative velocity as the controlling parameter makes it impossible for the shock absorber to differentiate between the dynamics of the vehicle and the dynamics of the wheel. To provide an acceptably controlled ride, sufficient rebound velocity damping must be used, which damping will choke the dynamic operation of the wheel below a point acceptable for either on or off-road high performance capability.

The present invention is a force sensitive suspension unit which optimizes vehicle isolation and comfort as one independent parameter and wheel to ground response as another independent parameter. The suspension unit is a gas pressurized hydropneumatic unit using pressurized gas over oil to provide a supporting force with or without attendant springs. Upon compression of the suspension unit, the gas volume is decreased and produces a progressive compression force. Compression damping is obtained by conventional velocity sensitive viscous damping limited by a relief valve. Rebound control of the wheel is achieved by hydraulically generating a force pair acting in opposed directions upon the vehicle and the wheel. Since the mass of the wheel is a small fraction of the mass of the vehicle, and in accordance with the formula force=mass ×acceleration ($F=ma$), the downward acceleration of the wheel will be substantially greater than the upward acceleration of the vehicle in inverse proportion to the respective masses. Consequently, on rebound, the vehicle and wheel accelerations and velocities are independent of one another to the extent that independent control of both the vehicle and wheel dynamics can be maintained.

It is therefore a primary object of the present invention to provide a suspension unit for optimizing vehicle isolation while urging powerful and positive continuous wheel to ground contact.

Another object of the present invention is to provide a force sensitive suspension unit which positively controls the rebound force of a wheel.

Still another object of the present invention is to provide a suspension unit sensitive to a force parameter, rather than a velocity parameter, to regulate the rebound of a wheel for a vehicle.

Still another object of the present invention is to provide a suspension unit which generates a wheel rebound acceleration greatly larger than that of the vehicle and basically inversely proportional to the ratio of the mass of the wheel to the mass of the vehicle.

Yet another object of the present invention is to provide a suspension unit exerting a controlled rebound force upon vehicle and wheel irrespective of the relative velocity between the wheel and the vehicle.

A further object of the present invention is to provide a suspension unit which provides at least a part of the support for a vehicle.

A still further object of the present invention is to provide a suspension unit useable independent of or in conjunction with suspension springs.

A yet further object of the present invention is to provide a gas over oil suspension unit for continuously supporting a vehicle.

These and other objects of the present invention will become apparent to those skilled in the art as the description thereof proceeds.

The present invention may be described with greater specificity and clarity with reference to the following drawings, in which:

FIG. 4 illustrates the elements of the present invention;

FIG. 5 illustrates the valve shown in FIG. 4;

FIG. 6 is a chart illustrating the force curves induced by a supporting spring operating in conjunction with the present invention;

FIG. 7 illustrates the elements of the present invention in conjunction with a supporting spring;

Powerful and positive wheel to ground contact is essential for overall handling and high speed performance in both on and off-road wheeled and tracked vehicles. To achieve the necessary rebound control of the vehicle's wheels (or tracks), the suspension system must be capable of providing rapid downward vertical acceleration and velocity of the wheels (or tracks). Simultaneously, drivability and comfort of the vehicle dictates minimum vehicular vertical acceleration and velocity. Because of these two conflicting requirements, velocity sensitive suspension units (conventional shock absorbers) necessarily effect a compromise biased toward either comfort and drivability or high speed performance, to the detriment of the other.

Figure 1:
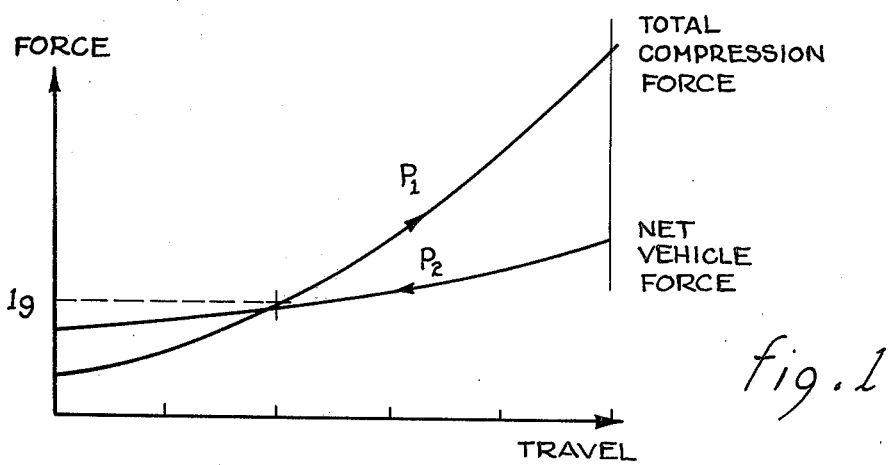
FIG. 1 is a chart illustrating the compression and rebound forces acting upon a vehicle.
Figure 2:
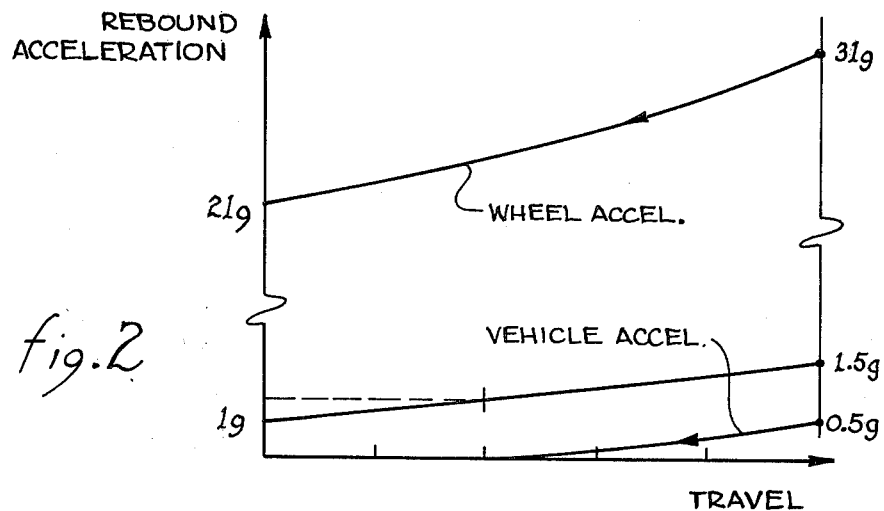
FIG. 2 is a chart illustrating the relative acceleration of the vehicle and wheel during rebound.
Figure 3:
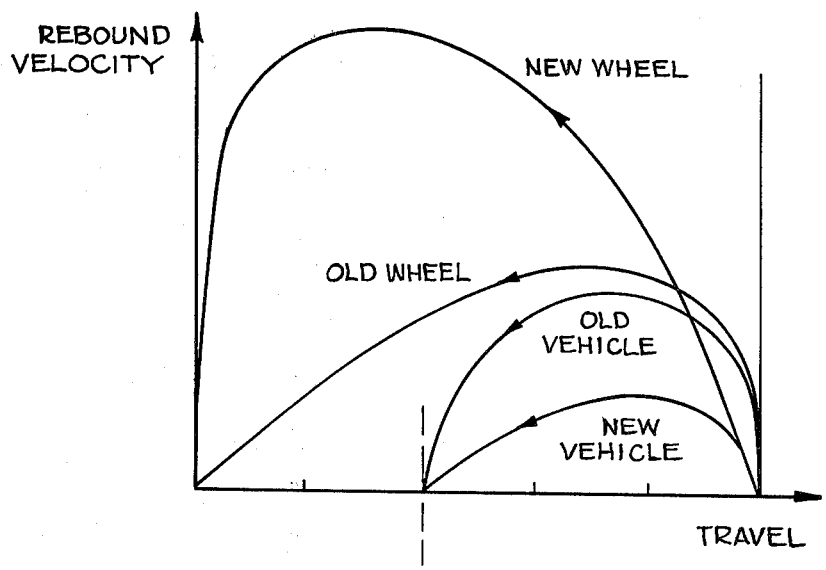
FIG. 3 is a chart comparing the rebound velocity of a vehicle and wheel when using conventional shock absorbers and when using the present invention.

To best portray an understanding of the operation and results achieved by the present invention, reference will be initially made to FIGS. 1, 2 and 3. The suspension unit is a gas pressurized hydropneumatic unit. Upon compression of the unit due to a road surface protuberance, the gas volume will be decreased. Due to the characteristics of gas compression, the required compression force is progressive or proportional to $(Y)^\chi$ where $\chi > 1$. In FIG. 1, the curve $P_1$ represents the maximum force exerted for any given external compression force exerted upon the suspension unit. Compression damping, which will modify curve $P_1$, is achieved in the conventional manner using velocity sensitive viscous damping limited by a relief valve to achieve the desired degree of damping. Curve $P_2$ represents the maximum allowable vertical rebound force of the vehicle commensurate with the vehicle parameters of comfort and drivability. Accordingly, the curves represent the forces available from which a pressure to control the rebound of the vehicle ($P_1 - P_2$) can be produced. It may be noted that the force exertable upon the vehicle is optimally close to a 1 g(gravity) force.

Through operation of the hydraulic system of the suspension unit, the compression force generated is translated into a force pair of action and reaction. The acceleration resulting from the force pair of the vehicle and wheel may be calculated as follows:

$$\text{Vehicle acceleration } (a_v) = \frac{\text{Force } (F)}{\text{Vehicle Mass } (m_v)} - 1g$$

$$\text{Wheel acceleration } (a_w) = \frac{\text{Force } (F)}{\text{Wheel Mass } (m_w)} + 1g$$

Assuming that the mass of the vehicle is twenty times the mass of the wheel ($m_v = 20 m_w$) and by controlling the vehicle acceleration to 0.5 g, the calculated acceleration of the wheel ($a_v$) will be 31 g. When the acceleration of the vehicle ($a_v$) drops to zero, the calculated acceleration of the wheel ($a_w$) is reduced to 21 g (see FIG. 2).

Accordingly, the suspension unit provides for separating the vertical acceleration of the vehicle from the vertical acceleration of wheel. As a result, the respective vertical velocities are also separated.

FIG. 3 is a graph which depicts the relative velocities between a vehicle and a wheel assembly using a conventional shock absorber and the relative velocities between a vehicle and a wheel assembly using a suspension unit incorporating the present invention. By inspection, it is apparent that the present invention results in substantially less vehicular velocity and substantially greater wheel assembly velocity during rebound. Thus, the vehicle is treated differently from the wheel assembly by limiting the vehicle dynamics while allowing a very positive rebound of the wheel assembly. And, the suspension unit allows more effective isolation of the vehicle from the road surface to better control the vehicle dynamics while at the same time it will allow high velocity wheel rebound for powerful and positive wheel to ground contact.

FIG. 4 illustrates a suspension system 10 including a suspension unit 11, a valve 12 and a pressure chamber 13. The suspension unit includes a cylinder 14 having a vehicle mounting lug 15 attached thereto and a piston 16 having a wheel assembly mounting lug 17 attached thereto. The combination of cylinder 14 and piston 16 define a pressure compartment 18 having a cross-sectional surface area $A_{18}$ equivalent to the area of the top of the piston. Hydraulic fluid or oil 19 is disposed within compartment 18 and serves as a medium under pressure.

Pressure chamber 13 is divided into two compartments 25, 26 by a movable piston 27. A gas 28 under pressure is disposed within compartment 25. The pressure exerted thereby biases piston 27 toward compartment 26 and subjects oil 19 therein to a similar pressure. Valve 12, regulating the flow of oil intermediate compartments 18 and 26, is in fluid communication with these compartments through conduits 29 and 30.

Under quiescent conditions and assuming the vehicle supported by suspension unit 11 is a motorcycle or other lightweight vehicle, the pressure exerted by gas 28 is translated by oil 19 into compartment 18. The resulting pressure within this compartment and acting over area $A_{18}$ provides sufficient force to prevent collapse of the suspension unit and supports the vehicle with respect to the wheel.

Turning now to FIG. 5, the construction and operation of valve 12 which provides the force sensitive operation of suspension unit 11 will be discussed. Valve 12 includes a spool 35 slidably mounted within a multi-chambered cylindrical element 36. A spring 37 biases the spool in an upward direction. A chamber 38 has a cross-sectional area $A_{38}$ equivalent to the area of the top of spool 35 and the chamber is in fluid communication with compartment 18 through conduit 29. A chamber 39, of the same outer diameter as chamber 38, and having a cross-sectional area $A_{39}$, encircles a necked down section 40 of the spool and is in fluid communication with conduit 30. A bypass annular chamber 41 encircles piston 42 of spool 35. The height of chamber 41 is selected such that displacement of spool 35 is necessary to place chamber 41 in fluid communication with chamber 39. Chamber 41 is in fluid communication with conduit 29 through conduit 43. A check valve 48 interconnects conduits 29 and 30 through bypass lines 49 and 50.

During compression of the suspension unit, oil 19 will be forced from compartment 18, through conduit 29, into bypass line 49 through check valve 48, into conduit 50 and into compartment 26 of pressure chamber 13. The resulting increase in pressure within compartment 26 will cause piston 27 to compress gas 28 by reducing the volume of compartment 25. Compression damping, as discussed above, can be effected through suitable restrictors or orifices in check valve 48. Simultaneously, and due to the pressure within conduit 29, the pressure within chamber 38 of valve 12 will increase to a value higher than that present within chamber 39. Since area $A_{39}$ is less than area $A_{38}$, the resultant force will drive spool 35 downwardly against the spring force exerted by spring 37. Downward movement of piston 42 will preclude fluid communication between annular chamber 41 and chamber 39. Thus, oil 19 will only flow through check valve 48.

Upon termination of compression of suspension unit 11, the upward force exerted by piston 16 through lug 17 will diminish or cease and result in a reduction or cessation of the force inducing the existing pressure within chamber 18. However, until relief, gas 28 within chamber 25, will be under the previously induced maximum pressure since relief cannot be achieved through bypass lines 50 and 49 due to check valve 48. The force urging rebound of the wheel assembly attached to lug 17 and created by the pressure of gas 28 will occur as follows. Since any reduction in pressure within chamber 18 is immediately reflected through conduit 29 as a reduction in pressure in chambers 38 and 41 of valve 12, a new force relationship within the valve will occur. The force exerted upon the underside of the piston 42 is equivalent to the pressure within chamber 39 times area $A_{39}$; similarly, the force exerted upon the top of piston 42 is equivalent to the pressure within chamber 38 times area $A_{38}$. This may be expressed mathematically as:

$$F_{39}=P_1 \times A_{39} \text{ and } F_{38}=P_2 \times A_{38}$$

where $P_1$ is equal to the maximum compression pressure and $P_2$ is equal to the reduced pressure within chamber 18; in addition, the force of spring 37, $F_{37}$, is added to $F_{39}$. Since $F_{38}$ is less than the sum of $F_{39}$ and $F_{37}$, spool 35 will be repositioned upwardly and commensurate movement of piston 42 will provide a flow path intermediate chamber 39 and annular chamber 41. Whereby, fluid communication intermediate conduit 30, line 43 and conduit 29 is established. Due to the pressure exerted by gas 28 within compartment 25, oil 19 will flow from compartment 26 through valve 12 into compartment 18 until the pressures within compartments 26 and 18 are stabilized. This pressure, acting upon area $A_{18}$ of piston 16 will produce a force, $F_w$, acting upon the wheel assembly attached to lug 17 and which force will result in acceleration of the wheel assembly. An equal and opposite force will act upon the vehicle, $F_v$, to produce an upward acceleration of the vehicle inversely proportional to its mass. However, the acceleration of the wheel assembly, $a_w$, with respect to the acceleration of the vehicle, $a_v$, is substantially greater because of the difference in mass between the vehicle and the wheel assembly. It may be pointed out that neither valve 12 nor any of the other elements of the system include any devices which are velocity sensitive or which limit the velocity of the wheel assembly on rebound.

It may be noted that during compression, the pressure present within conduit 29 and conveyed to chamber 38, in combination with the area $A_{38}$, creates sufficient force to maintain spool 35 in its lower position. Moreover, a vent 110 exists at the lower portion of the multi-chambered cylinder to vent the space adjacent the lower surface of section 40 and preclude the formation of back pressure adjacent the lower end of section 40.

In heavy vehicles, where the quiescent pressure of gas 28 is insufficient to support the weight of the vehicle, support springs external to the suspension unit may be required. By the use of such springs, the force diagram illustrated in FIG. 1 would be modified and appear as illustrated in FIG. 6. Herein, the total compression force available would be the sum of the pneumatic force exerted by the gas within its chamber and the mechanical force exerted by the compressed spring. To control the vertical acceleration of the vehicle during rebound, the rebound force induced by the mechanical spring has to be resisted.

Figure 8:
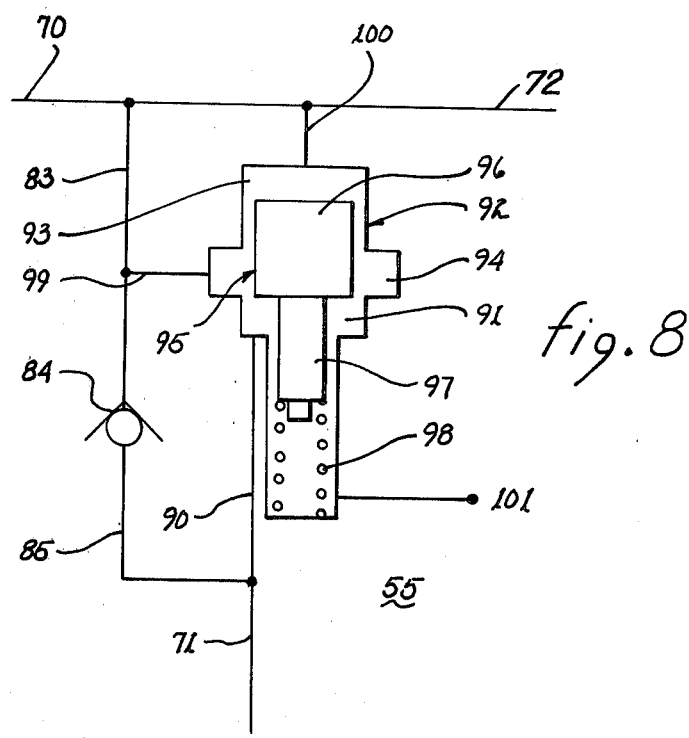
FIG. 8 illustrates the valve shown in FIG. 7.

Suspension system 53 illustrated in FIGS. 7 and 8 operates in the manner described above with respect to suspension system 10 except that certain rearrangements have been incorporated to accommodate the forces induced by the external support spring. Suspension system 53 includes a suspension unit 54 cooperating in conjunction with a support spring 57, a valve 55 and a pressure chamber 56. A lug 58 extends from cylinder 59 and is secured to the vehicle. A lug 60 extends from a spool 61 and is secured to the wheel assembly. The ends of spring 57 are either secured to the respective parts of suspension unit 54 or directly to the vehicle and the wheel assembly. A variable sized compartment 63 is disposed intermediate cylinder 59 and the top of spool 61, which top defines a cross-sectional area $A_{63}$ of the chamber. A further compartment 64 is disposed about necked down section 65 of spool 61 intermediate piston 66 and the bottom of cylinder 59. The cross-sectional area of compartment 64, identified as $A_{64}$, is equal to the surface area of the underside portion of piston 66.

A conduit 70 provides fluid communication intermediate compartment 63 and valve 55; a similar conduit 61 provides fluid communication intermediate compartment 64 and valve 55. A further conduit 72 interconnects valve 55 with compartment 75 within pressure chamber 56. A movable piston 78 is disposed within pressure chamber 56 to segregate oil 67 within compartment 75 from gas 68 within compartment 77.

Turning now to FIG. 8, the construction and operation of valve 55 will be reviewed. On compression of suspension unit 54, oil within compartment 63, initially under pressure equivalent to the pressure of the gas within chamber 77, will become further pressurized due to upward movement of spool 61. The increase in pressure will result in a flow of oil through conduits 70 and conduit 72 into compartment 75. The increased oil volume within compartment 75 will force piston 78 downwardly to further compress the gas within compartment 77. Simultaneously, an equilization of pressure will occur within compartment 64 of suspension unit 54 through the flow of oil from compartment 63 into conduit 70, into line 83, through check valve 84 into line 85 and into compartment 64 through conduit 71. Thus, the pressure exerted by the oil on either side of piston 66 will be essentially the same. However, because of the size difference between area $A_{63}$ and area $A_{64}$, a greater force will be exerted upon the top surface of piston 66 than upon the lower surface of the piston. Since the volume of oil removed from within compartment 63 is greater than the volume displaced within compartment 64, the excess displacement will result in volumetric expansion of compartment 75 and place gas 68 within compartment 77 under a higher pressure.

During rebound, the external upward force exerted upon spool 61 will be reduced or absent. Consequently, the pressure accumulated within compartment 77 will be greater than the pressure of the oil within compartment 75. This pressure differential within pressure chamber 56 will result in upward movement of piston 78, forcing a flow of oil into conduit 72. The flow of oil through conduit 72 will flow into compartment 63 via conduit 70. The pressure in compartment 63, acting upon area $A_{63}$, will produce a force resulting in accelerating extension of spool 61 to maintain the wheel assembly in contact with the underlying road surface. Additionally, the energy stored in spring 57 will aid such acceleration unless the force of the spring is inhibited. Such inhibition is necessary, as stated above, in order to control rebound force and upward acceleration of the vehicle.

Control of the rebound force pair due to the force provided by spring 57 and the gas spring (gas 68 under compression within compartment 77) is achieved through the maintenance of an acceleration resistive force within compartment 64 and bearing against the bottom surface of piston 66. Upon rebound, the volumetric contraction of compartment 64 results in a flow of oil therefrom through conduit 71 and line 90 into chamber 91 of multi-chambered cylinder 92. The multi-chambered cylinder includes not only lower chamber 91 but also an upper chamber 93 and an annular chamber 94. A spool 95 having a piston 96 and a necked down section 97 is displaceable within a multi-chambered chamber. A spring 98 is disposed within chamber 90 to bias spool 95 upwardly. A pressure increase within chamber 91, resulting from the flow of oil thereinto, produces an upward force upon spool 95 until piston 96 is sufficiently displaced to place annular chamber 94 in fluid communication with chamber 91. As a result of such fluid communication, further oil introduced into chamber 91 will flow into chamber 94, through line 99 and line 83 and into conduit 70. Upward displacement of spool 95 is resisted by the force exerted by the oil under pressure within chamber 93; chamber 93 is in fluid communication with conduit 70 through line 100, and the pressure within conduit 70 is less than the pressure within conduit 71. The force exerted by the oil under pressure in chamber 93 is a function of the pressure times area $A_{93}$ at the top of piston 96. Similarly, the force tending to displace the spool upwardly is a function of the pressure times area $A_{91}$ of the lower surface of piston 96. By appropriate selection of the differential areas for the top and bottom of the piston, in concert with the desired pressure differential between chambers 91 and 93, control of the upward movement of the piston to regulate the flow of oil from conduit 71 through chamber 91, line 99, line 83, into conduit 70 can be achieved. Accordingly, the force developed to resist the rebound force induced by spring 57 and gas spring 78 is achieved by appropriate selection of a differential in areas $A_{91}$ and $A_{93}$ in combination with the force exerted by spring 98.

It may be noted that during compression, the pressure present within conduit 70 is conveyed to chamber 93 via line 100, which increase in pressure, in combination with the area $A_{93}$, creates sufficient force to maintain spool 95 in its lower position. Moreover, a vent 101 exists at the lower portion of the multi-chambered cylinder to vent the space adjacent the lower surface of section 97 and preclude the formation of back pressure adjacent the lower end of section 97.

Figures 9, 10:
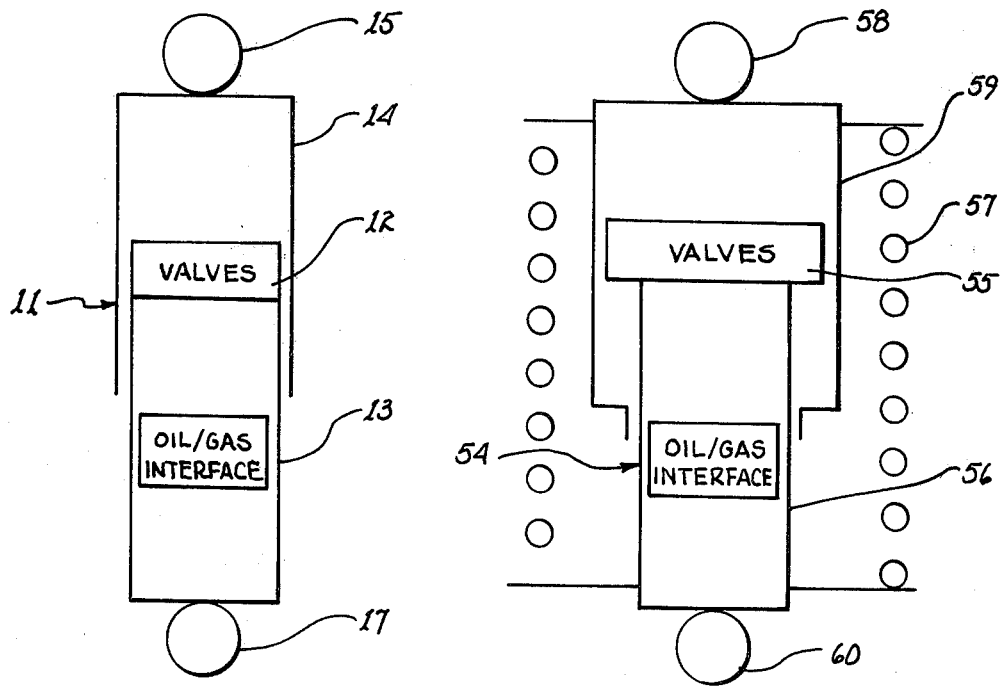
FIG. 9 illustrates the elements shown in FIG. 4 mounted in a single unit.
FIG. 10 illustrates the elements shown in FIG. 7 mounted in a single unit.

FIG. 9 illustrates an embodiment of the invention shown in FIGS. 4 and 5 wherein valve 12, pressure chamber 13 and cylinder 14 are incorporated within the confines of the suspension unit itself. Similarly, FIG. 10 illustrates an embodiment incorporating the structure illustrated in FIGS. 7 and 8 wherein the suspension unit itself incorporates cylinder 59, valve 55 and pressure chamber 56.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A force sensitive suspension system for regulating the compression and rebound acceleration of a vehicle and a wheel assembly attached to the chassis of the vehicle, said suspension system comprising in combination:
   (a) a suspension unit for interconnecting the chassis of the vehicle with the wheel assembly, said suspension unit including a variable volume compartment for receiving and discharging a fluid to regulate the acceleration of displacement between the chassis and the wheel assembly;
   (b) a pressure chamber for housing a compressible fluid under pressure and an incompressible fluid subjected to the pressure exerted by the compressible fluid; and
   (c) a valve for regulating the flow of fluid intermediate said compartment and said pressure chamber, said valve comprising in combination:
      i. a closed cylindrical element, said cylindrical element including a first port in fluid communication with one end, a second port in fluid communication with the opposed end and a third port in fluid communication with a central portion of said cylindrical element;
      ii. a spool axially slidably mounted within said cylindrical element for regulating fluid flow intermediate said second and third ports in response to axial translation of said spool, said spool including a first end surface of a first area disposed in said one end of said cylindrical element and a second end surface of a second area disposed in said opposed end of said cylindrical element, said second area being smaller than said first area to provide a force relationship commensurate with the relative masses of the chassis and the wheel assembly;
      iii. first conduit means for interconnecting said compartment with said first and third ports;
      iv. second conduit means for interconnecting said pressure chamber with said second port; and
      v. bypass means including a one-way valve, for accommodating fluid flow from said first conduit means directly to said second conduit means external to said cylindrical element in response to a fluid pressure differential between said compartment and said pressure chamber and for preventing the reverse flow of the fluid;
   whereby, the rate of volumetric expansion of said compartment and commensurate rebound acceleration of the wheel assembly is a function of the difference in forces acting at said one end and said opposed end of said spool.

2. The suspension system as set forth in claim 1 including bias means for biasing said spool toward said one end of said cylindrical element.

3. The suspension system as set forth in claim 2 wherein said spool includes a necked down section extending from said second end surface and said second area corresponds to the annular area circumscribing said necked down section in said second end surface.

4. The suspension system as set forth in claim 3 wherein said bias means comprises a spring.

5. The suspension system as set forth in claim 3 wherein said pressure chamber and said valve are incorporated within the confines of said suspension unit.

6. The suspension system as set forth in claim 1 wherein said suspension unit is devoid of spring means intermediate the chassis and the wheel assembly.

7. The suspension system as set forth in claim 1 wherein said pressure chamber and said valve are incorporated within the confines of said suspension unit.

8. A force sensitive suspension system for regulating the compression and rebound acceleration of a vehicle and a wheel assembly attached to the chassis of the vehicle, said suspension system comprising in combination:

(a) a suspension unit for interconnecting the chassis of the vehicle with the wheel assembly, said suspension unit including a cylinder having an upper compartment, a lower compartment and an axially moveable piston separating said upper compartment from said lower compartment, said piston having a first face defining a wall of said upper compartment and a second face defining a wall of said lower compartment, said first face being of greater volume than said second face, said upper and lower compartments being adapted for receiving and discharging a fluid to regulate the acceleration of displacement between the chassis and the wheel assembly and spring means for urging displacement between the wheel assembly and the chassis;

(b) a pressure chamber for housing a compressible fluid under pressure and an incompressible fluid subjected to the pressure exerted by the compressible fluid; and (c) a valve for regulating the flow of fluid intermediate said upper and lower compartments and said pressure chamber, said valve comprising in combination;

i. a closed cylindrical element, said cylindrical element including a first port in fluid communication with one end, a second port in fluid communication with the opposed end and a third port in fluid communication with a central portion of said cylindrical element;

ii. a spool axially slidably mounted within said cylindrical element for regulating fluid flow intermediate said second and third ports in response to axial translation of said spool, said spool including a first end surface of a first area disposed in said one end of said cylindrical element and a second end surface of a second area disposed in said opposed end of said cylindrical element, said second area being smaller than said first area to provide a force relationship commensurate with the relative masses of the chassis and the wheel assembly;

iii. first conduit means for interconnecting said upper compartment with said first and third ports;

iv. second conduit means for interconnecting said pressure chamber with said first port;

v. third conduit means for interconnecting said lower compartment with said second port; and vi. bypass means including a one-way valve, for accommodating fluid flow to said third conduit means from said first conduit means external to said cylindrical element in response to a fluid pressure differential existing in said third and first conduit means and for preventing the reverse flow of the fluid;

whereby, the rate of volumetric expansion of said compartment and commensurate rebound acceleration of the wheel assembly is a function of the difference in forces acting at said one end and said opposed end of said spool.

9. The suspension system as set forth in claim 8 wherein said pressure chamber and said valve are incorporated within the confines of said suspension unit.

10. The suspension system as set forth in claim 8 including bias means for biasing said spool toward said one end of said cylindrical element.

11. The suspension system as set forth in claim 10 wherein said spool includes a necked down section extending from said second end surface and said second area corresponds to the annular area circumscribing said necked down section in said second end surface.

12. The suspension system as set forth in claim 11 wherein said bias means comprises a spring.

13. The suspension system as set forth in claim 11 wherein said pressure chamber and said valve are incorporated within the confines of said suspension unit.

* * * * *